United States Patent
Mizuyama

(10) Patent No.: US 8,798,415 B2
(45) Date of Patent: Aug. 5, 2014

(54) TRANSPARENT DIFFUSER FOR DIFFUSING MULTIPLE WAVELENGTHS OF LIGHT AND METHOD OF MANUFACTURING TRANSPARENT DIFFUSER

(75) Inventor: Yosuke Mizuyama, Newton, MA (US)

(73) Assignee: Panasonic Corporation, Osaka (JP)

(*) Notice: Subject to any disclaimer, the term of this patent is extended or adjusted under 35 U.S.C. 154(b) by 25 days.

(21) Appl. No.: 13/553,925

(22) Filed: Jul. 20, 2012

(65) Prior Publication Data
US 2014/0023317 A1 Jan. 23, 2014

(51) Int. Cl.
G02B 6/34 (2006.01)
B29D 11/00 (2006.01)

(52) U.S. Cl.
USPC .............. 385/37; 385/39; 359/575; 362/355; 264/1.24

(58) Field of Classification Search
USPC .............. 385/37–39; 359/575, 576, 588, 599, 359/601; 362/355, 607; 428/403
See application file for complete search history.

(56) References Cited

U.S. PATENT DOCUMENTS

| | | | |
|---|---|---|---|
| 5,283,690 A * | 2/1994 | Miyake et al. | 359/566 |
| 6,057,096 A * | 5/2000 | Rothschild et al. | 435/6.13 |
| 6,692,830 B2 * | 2/2004 | Argoitia et al. | 428/403 |
| 8,619,363 B1 * | 12/2013 | Coleman | 359/576 |
| 2009/0091833 A1 | 4/2009 | Mennig et al. | |
| 2009/0110356 A1 * | 4/2009 | Xiang et al. | 385/129 |
| 2011/0090427 A1 * | 4/2011 | Ohue et al. | 349/65 |

* cited by examiner

Primary Examiner — Akm Enayet Ullah
(74) Attorney, Agent, or Firm — Greenblum & Bernstein, P.L.C.

(57) ABSTRACT

A light diffuser panel for coupling to an optical element, includes a substrate with a first surface that is diffusive to a plurality of wavelengths of light and a second surface, wherein the substrate comprises a material with a refractive index $n_{in}$ that is greater than a refractive index $n_d$ of a medium outside of the first surface, $\lambda_{min}$ is a minimum wavelength of the plurality of wavelengths of light, $\lambda_{max}$ is a maximum wavelength of the plurality of wavelengths of light, the first surface is a diffractive grating surface with a grating period P, the grating period P is greater than $\lambda_{max}/(n_d+n_{in})$, and P is smaller than $\lambda_{min}$.

13 Claims, 9 Drawing Sheets

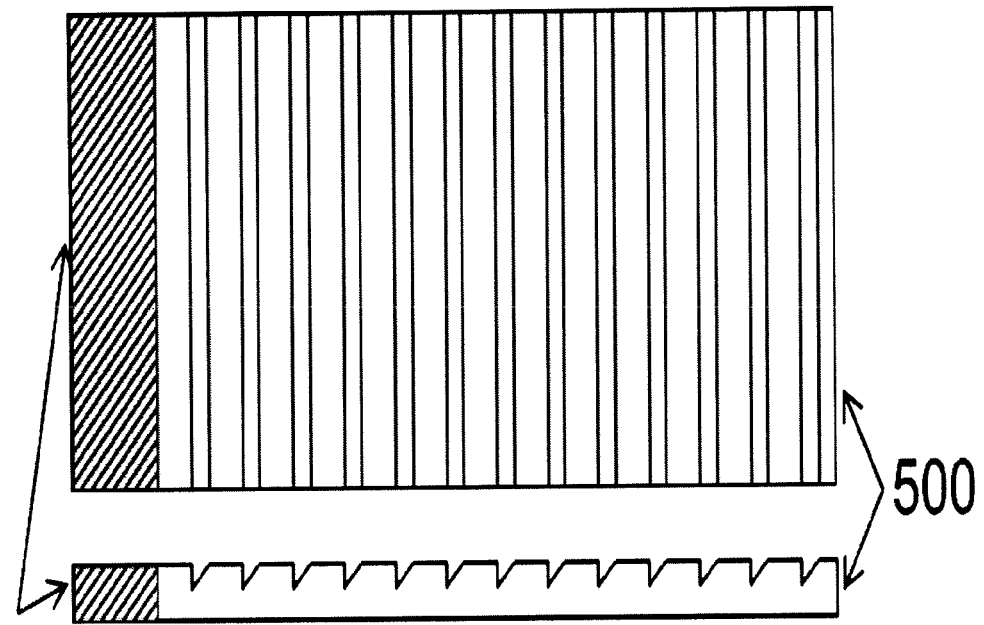
550    Fig. 7(c)
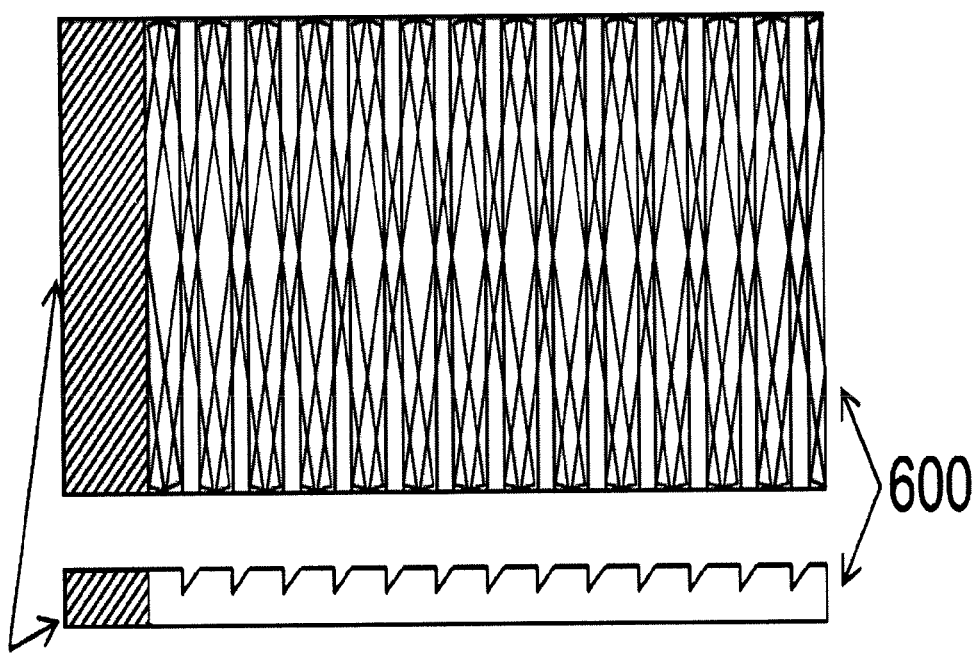
650    Fig. 7(d)

TRANSPARENT DIFFUSER FOR DIFFUSING MULTIPLE WAVELENGTHS OF LIGHT AND METHOD OF MANUFACTURING TRANSPARENT DIFFUSER

BACKGROUND

1. Field of the Disclosure

The present invention generally relates to light diffusers for illuminating environments or objects and methods of manufacturing light diffusers.

2. Background Information

Light sources used for illumination typically require diffusers to diffuse or to spread out or to scatter the light to produce soft light, which generally cast shadows with no edges or soft edges as opposed to sharp edges. For example, in photography, soft light is used to reduce visibility of wrinkles for people to achieve a more youthful look.

Typical diffusers are hazy in appearance, or the diffusers are opaque or non-transparent. That is, an observer cannot see objects clearly through a typical diffuser. Typical diffusers may include for example, ground glass diffusers, teflon diffusers, holographic diffusers, opal glass diffusers, and greyed glass diffusers. Because such diffusers are not transparent, their presence in the view of observers may seem distracting and unpleasant. Additionally, typical diffusers may scatter significant amount of light back toward the light source, and thus, efficiency of the light source is reduced when such typical diffusers are used.

FIG. 1 illustrates a conventional diffuser panel, which may be for example, a ground glass diffuser panel.

Such conventional ground glass diffuser panels are isotropically diffusive and therefore look hazy and not transparent. As illustrated in FIG. 1, when light, generally with wavelength in the visible band, intersects the diffusive surface 12 of the diffuser panel 10, the uneven and rough texture of the diffusive surface causes the light to become scattered or diffused in nearly all directions, depending on the varying surface angles of the diffusive surface. The diffuser panel 10 comprises another surface 14, which may be generally flat or can be another diffusive surface. Because the light is diffused in nearly all directions, the diffuser is called isotropically diffusive. Furthermore, because the diffuser is isotropically diffusive, regardless of the angle of the incident light intersecting the diffusive surface, normal incident light, which is light intersecting generally perpendicularly to the plane of diffuser ($\theta_{in}=0$), would also be diffused isotropically. This would thus cause objects to appear hazy and not clearly visible when viewed through such conventional ground glass diffusers, thus making the conventional ground glass diffusers appear opaque or non-transparent.

FIG. 2 illustrates another conventional diffuser panel, which may be for example, an ordinary grating type diffuser panel with a grating period (not shown) greater than the wavelengths of visible light.

Such conventional ordinary grating diffuser panels are also isotropically diffusive and therefore look hazy and not transparent. As illustrated in FIG. 2, light intersects the diffusive surface 22 of the diffuser panel 20. The diffusive surface 22 has a grating period (not shown). The grating period is the distance between the corresponding edges of adjacent grooves of the grating. The grating period (not shown) of such a conventional ordinary grating diffuser panel is greater than the wavelengths of visible light. The grating of the diffusive surface 22 causes the light to become scattered or diffused in nearly all directions. The diffuser is therefore also isotropically diffusive. This causes the grating surface to appear non-transparent. The diffuser panel 20 has another surface 24, which may be generally flat. Furthermore, because the diffuser is generally isotropically diffusive regardless of the angle of the incident light intersecting the diffusive surface, normal incident light ($\theta_{in}=0$) would also be diffused isotropically. This would thus cause objects to appear hazy and not clearly visible when viewed through such conventional ordinary grating diffusers, thus making the conventional ordinary grating diffusers appear opaque or non-transparent.

FIG. 3 illustrates a conventional subwavelength anti-reflective (AR) surface panel with a binary grating, which looks transparent but does not defuse light.

As illustrated in FIG. 3, the conventional subwavelength binary grating panel 30 has a surface 32 with grating period P1 and another surface 34 which may be generally flat.

The grating equation showing the relationship between the grating period p, refractive index of incident side $n_{in}$, refractive index of exit side $n_d$, incident angle $\theta_{in}$, diffraction angle $\theta_d$, incident light wavelength $\lambda$, and diffraction order m (integer) is given by, $$p(n_d \sin \theta_d - n_{in} \sin \theta_{in}) = m\lambda \quad (1)$$

The conventional subwavelength AR binary grating surfaces may satisfy, where the grating period p=P1, and $P1 < \lambda/(n_d+n_{in})$ (2)

When equation (2) is true, then there is no solution for equation (1) for diffraction orders (where |m| is greater or equal to 1, and $|\sin \theta_{in}| \leq 1$), and only zero order diffraction occurs for all incident angles.

For example, if $n_d=1$ (air), $n_{in}=1.5$ (acrylic), then if the grating period $P1 < \lambda/2.5$, the panel will not diffract light of $\lambda$. If $\lambda=0.39$ um (the low wavelength end of the visible spectrum), then if P1<0.156 um, P1 would be less than $\lambda/2.5$ for all the higher wavelengths of the visible spectrum as well, and the panel will not diffract any visible light.

In such a case, there is no diffraction of light, such that the light can transmit through the panel without being diffracted. This would cause objects to be clearly visible when viewed through such conventional subwavelength binary grating from any angle, thus making the conventional subwavelength binary grating appear transparent. Because there is also little to no reflection of light in the conventional subwavelength binary grating, the conventional subwavelength binary grating would also appear to be anti-reflective.

Therefore, a transparent diffuser that can provide higher efficiency of lighting and a more pleasant transparent view may be needed.

SUMMARY OF THE DISCLOSURE

The present disclosure, through one or more of its various aspects, embodiments, and/or specific features or sub-components, provides various device, apparatus, or structures that can achieve the transparent diffuser, as well as method that can be used to manufacture the transparent diffuser.

In one embodiment of the invention, a light diffuser panel for coupling to an optical element, includes a substrate with a first surface that is diffusive to a plurality of wavelengths of light and a second surface, wherein the substrate comprises a material with a refractive index $n_{in}$ that is greater than a refractive index $n_d$ of a medium outside of the first surface, $\lambda_{min}$ is a minimum wavelength of the plurality of wavelengths of light, $\lambda_{max}$ is a maximum wavelength of the plurality of wavelengths of light, the first surface is a diffractive grating surface with a grating period P, the grating period P is greater than $\lambda_{max}/(n_d+n_{in})$, and P is smaller than $\lambda_{min}$.

According to another feature of the invention, the substrate comprises at least one location on an edge of the substrate configured to receive the plurality of wavelengths of light from a light emitting element, at an angle of incidence relative to the normal of one of the first surface and the second surface, the angle of incidence being greater than a critical angle of the substrate, such that the plurality of wavelengths of light are waveguided in the substrate by total internal reflection and diffused by diffraction to allow a portion of at least one of the plurality of wavelengths of light to exit the substrate from at least one of the first surface and the second surface.

According to another feature of the invention, the light emitting element is mounted on the at least one location on the edge of the substrate, coupled to the substrate and configured to transmit the plurality of wavelengths of light into the substrate at the angle of incidence.

According to another feature of the invention, the first surface comprises a plurality of binary grating grooves to allow a portion of at least one of the plurality of wavelengths of light to exit the substrate from the first surface and the second surface.

According to another feature of the invention, the first surface comprises a plurality of blaze grating grooves to allow a portion of at least one of the plurality of wavelengths of light to exit the substrate from only the second surface.

According to another feature of the invention, the first surface comprises at least one of symmetrical triangular grating, symmetrical sinusoidal grating, asymmetrical triangular grating, and asymmetrical sinusoidal grating.

According to another feature of the invention, the light emitting element comprises at least one of a LED, a laser diode, a fluorescent light source, an optical waveguide, an optical reflector, an optical refractor, and a polarizer.

According to another feature of the invention, the first surface comprises a plurality of grating grooves in a pattern comprising at least one of parallel grooves, diagonal grooves, triangular grooves, spiral grooves, and hatched grooves.

Another embodiment of the invention relates to a manufacturing process or method for manufacturing a light diffuser panel that is capable of diffusing a plurality of wavelengths of light, wherein $\lambda_{min}$ is a minimum wavelength of the plurality of wavelengths of light and $\lambda_{max}$ is a maximum wavelength of the plurality of wavelengths of light. The method includes determining a material for a substrate with a refractive index $n_{in}$ that is greater than a refractive index $n_d$ of a medium within which the substrate is positioned, selecting a grating period P, wherein the grating period P is greater than $\lambda_{max}/(n_d+n_{in})$, and P is smaller than $\lambda_{min}$, and forming the substrate with a first surface that is diffusive to the plurality of wavelengths of light and a second surface, wherein the first surface is a diffractive grating surface with a grating period P.

According to another feature of the invention, the forming of the substrate includes forming a mold with a molding surface that is an inverse match of the first surface having the diffractive grating surface with the grating period P; and at least one of injecting and casting the material into the mold to form the substrate.

According to another feature of the invention, the forming of the substrate includes forming the substrate; and at least one of cutting, etching, and pressing the first surface to form the diffractive grating surface on the first surface.

BRIEF DESCRIPTION OF THE DRAWINGS

The present invention is further described in the detailed description which follows, in reference to the noted plurality of drawings, by way of non-limiting examples of preferred embodiments of the present invention, in which like characters represent like elements throughout the several views of the drawings.

FIGS. 7(a)-7(d) illustrate exemplary diffuser panels with light emitting elements integrated on one edge in plane views and cross sectional views in accordance with the embodiment described herein.

DETAILED DESCRIPTION

The present disclosure, through one or more of its various aspects, embodiments and/or specific features or sub-components, is thus intended to bring out one or more of the advantages as specifically noted below.

Figure 1:
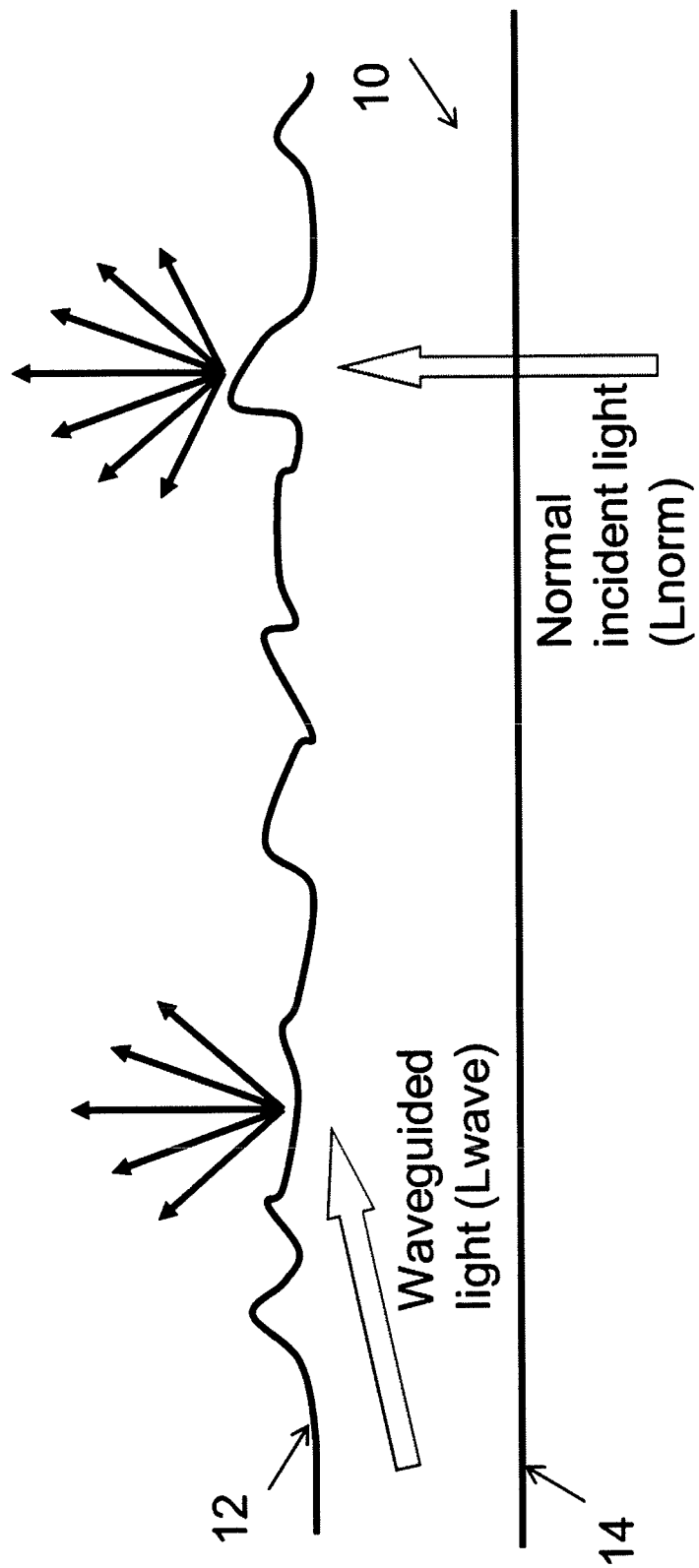
FIG. 1 illustrates a conventional diffuser panel.
Figure 2:
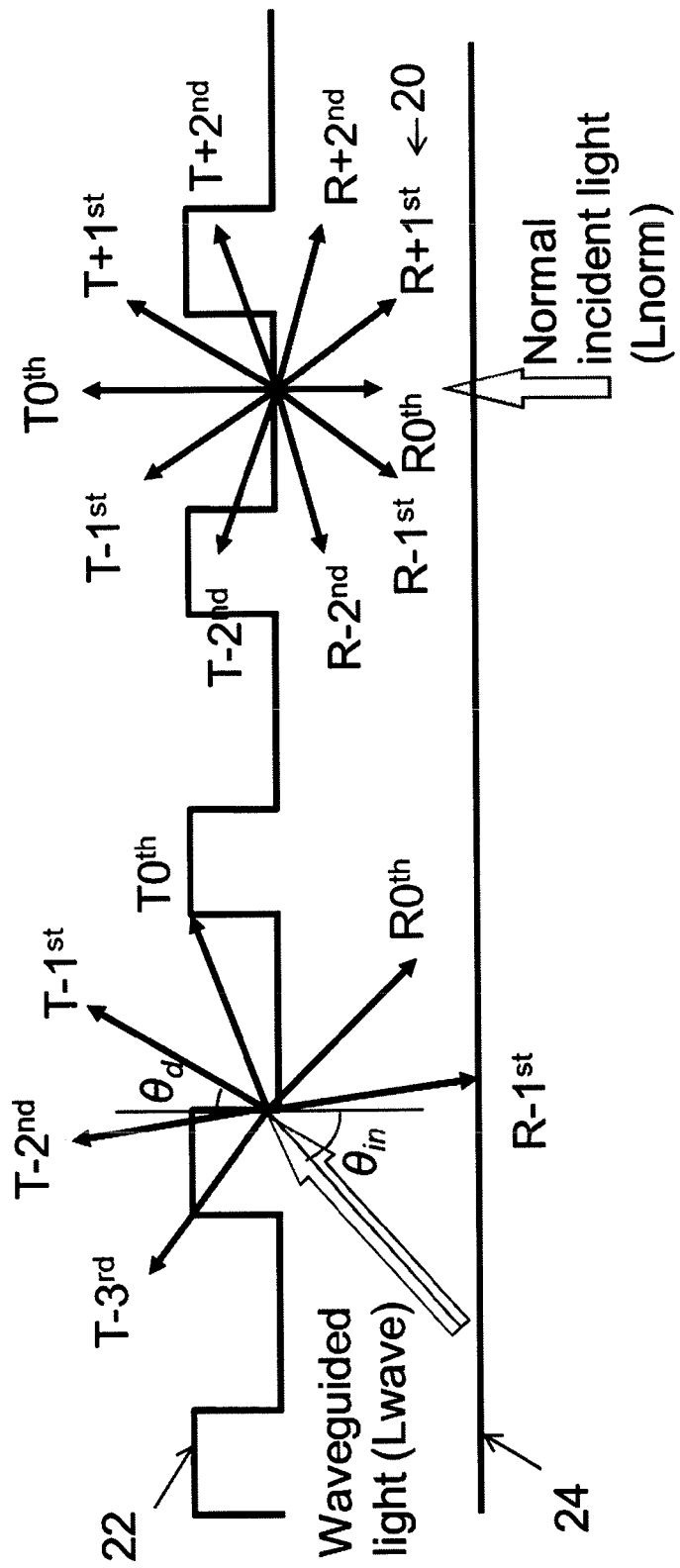
FIG. 2 illustrates another conventional diffuser panel.
Figure 3:
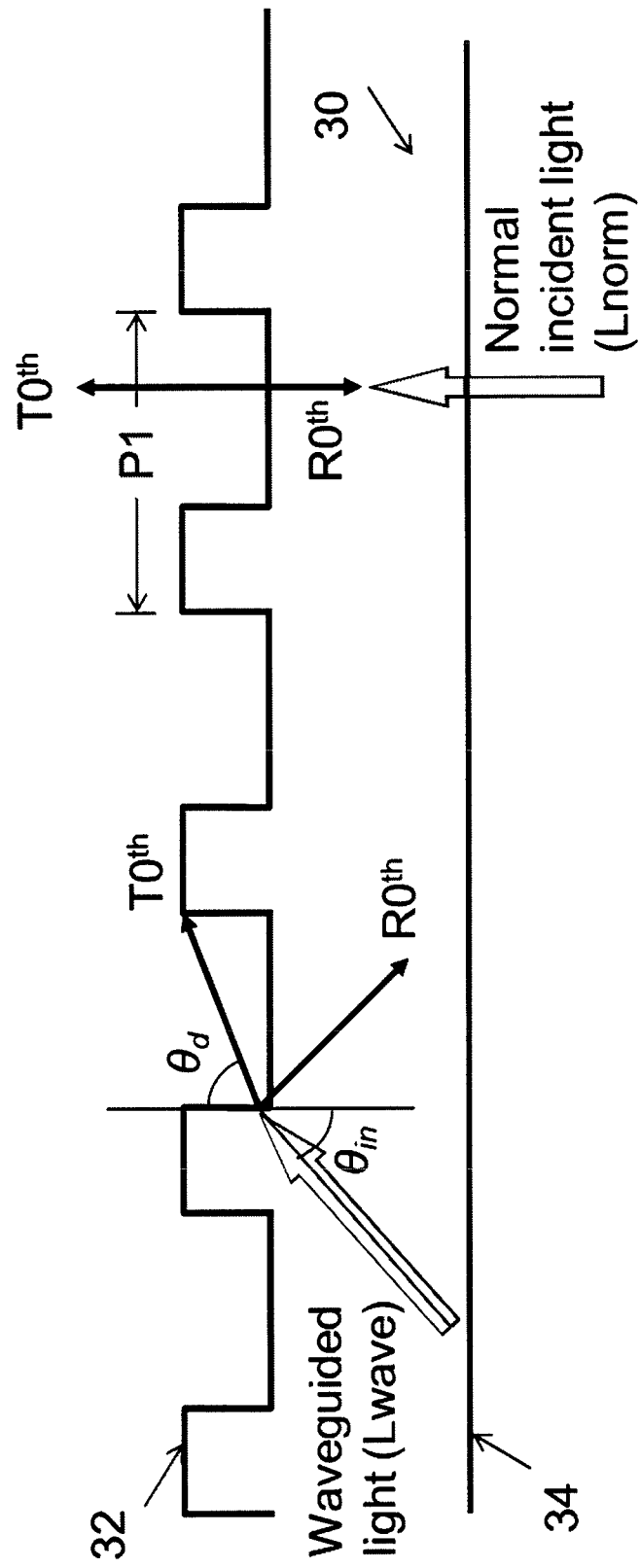
FIG. 3 illustrates a conventional subwavelength anti-reflective (AR) diffuser panel.
Figure 4:
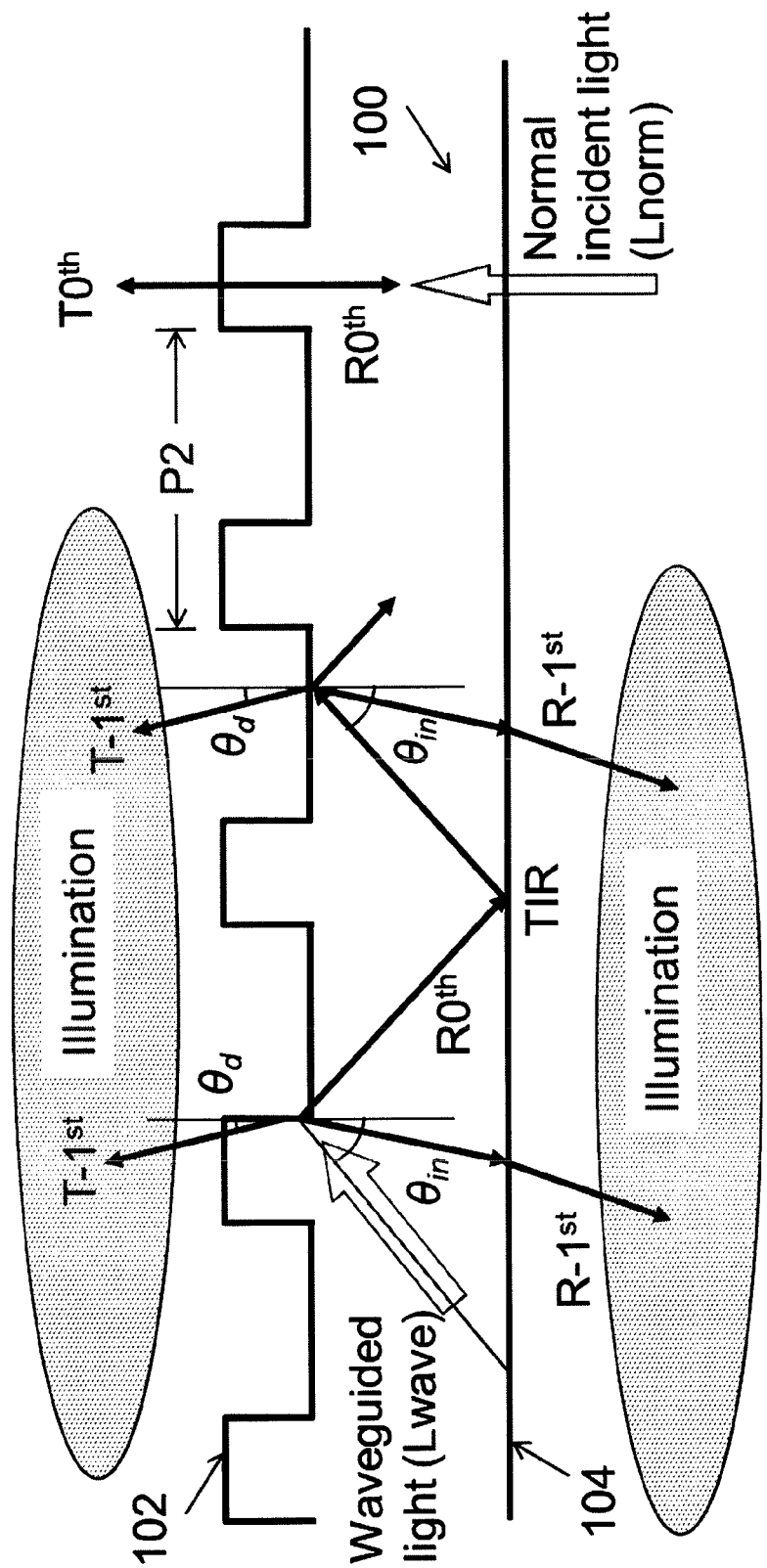
FIG. 4 illustrates a cross sectional view of an exemplary binary grating surface panel in accordance with the embodiment described herein.

FIG. 4 illustrates a cross sectional view of an exemplary binary grating surface diffuser panel in accordance with the embodiment described herein. The diffuser panel 100 is generally shown in the cross sectional view. The diffuser panel 100 comprises a grating surface 102 which may be, for example, a binary grating surface. Also for example, the other surface 104 of the diffuser panel 100 may be generally flat and smooth.

The exemplary binary grating surface 102 has a grating period P2 that satisfies, $$\lambda/(n_d+n_{in}) < P2 < \lambda \quad (3)$$

(for coverage of the entire visible spectrum, $\lambda$ is preferably from 0.38 um to 0.78 um).

Equation (1) yields no solution for the diffraction order (non-zero m) for the normal incident angle ($\theta_{in}=0$) or near the normal incident angle, such that the light at or near the normal incident angle transmits through the panel without being diffracted. In such a case, objects would be clearly visible when viewed through the exemplary binary grating surface diffuser panel, through either panel sides of the diffuser panel at or near the normal incident angle. Thus, the exemplary diffuser panel would appear to be transparent.

On the other hand, for incident angles greater than the total internal reflection angle (or the critical angle), $\sin^{-1}(1/n_{in})$, which are the angles for light waveguided in the diffuser panel, equation (1) yields diffraction orders but only a few (preferably only one). This diffraction is diffusive, because the light is spread out and can be emitted over the entire panel surface. The exemplary diffuser panel can be used for illumination if light is waveguided in the panel and directed toward the grating surface 102 at an oblique angle.

For an illustrative example:

If $\lambda/p=1.5$ and $n_d=1$ (air), $n_{in}=1.5$ (acrylic) satisfying $\lambda/(n_d+n_{in})<p<\lambda$, the grating equation of equation (1) can rewritten as $$\sin\theta_d = 1.5m + 1.5\sin\theta_{in} \qquad (4)$$

In this case, diffraction angle $\theta_d$ would have no solution for non-zero m, and only zero order diffractions occurs, if $|1.5\sin\theta_{in}|<0.5$, or $|\theta_{in}|<19.47°$. Thus, objects would be clearly visible when viewed at an angle $|\theta_{in}|<19.47°$, where there are no diffraction orders.

The solutions to equation (1) for a waveguided light at an incident angle $\theta_{in}=60°$ in this example yield one set of transmission diffraction order light rays (T-$1^{st}$) at generally $-11.6°$, reflection diffraction order light rays (R-$1^{st}$) at generally $-11.6°$ in the other side, and reflection zero order light rays (R$0^{th}$) at the waveguided light angle of $\theta_{in}=60°$.

As illustrated in FIG. 4, the transmission and reflection diffraction orders light rays (T-$1^{st}$) and (R-$1^{st}$) are transmitted out of the diffuser panel as illumination while the reflection zero order light rays (R$0^{th}$) continues to propagate inside the panel as waveguided light to generate additional sets of transmission and reflection diffraction orders light rays (T-$1^{st}$) and (R-$1^{st}$) at the subsequent locations where the reflection zero order light rays (R$0^{th}$) intersects the grating surface 102 of the panel.

Preferably, the grating period P2 satisfies, $$\lambda_{max}/(n_d+n_{in})<P2<\lambda_{min} \qquad (5)$$

for multiple wavelengths ranging from a minimum wavelength $\lambda_{min}$ and a maximum wavelength $\lambda_{max}$ (where $\lambda_{min}<\lambda_{max}$).

For an illustrative example, if $\lambda_{min}=0.38$ um (minimum wavelength of visible light), $\lambda_{max}=0.78$ um (maximum wavelength of visible light), $n_d=1$ (air) and $n_{in}=1.5$ (acrylic), the preferred range of p is 0.312 um<p<0.38 um.

Figure 6A:
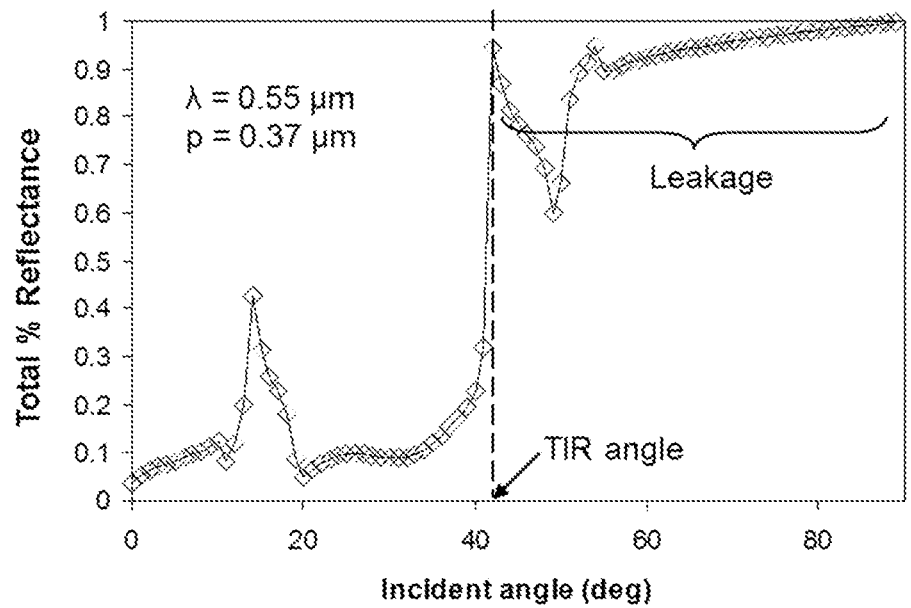
FIG. 6(a) illustrates the optical reflection characteristics of an exemplary binary grating surface panel, with imperfect total internal reflection (TIR) in accordance with the embodiment described herein.

FIG. 6(a) illustrates the optical reflection characteristics of the above exemplary diffuser panel 100, in accordance with the embodiment described herein. As illustrated in FIG. 4, a binary grating surface such as the grating surface 102 disclosed in the above embodiment allows for bi-directional illumination, which is where the diffuser panel 100 cast diffused light from the waveguided light at both sides of the panel. The bi-directional illumination capability of the grating surface 102 is due to the imperfect total internal reflection (TIR) in the case of the binary grating surface. As illustrated in FIG. 6(a), in the case of the binary grating surface, imperfect TIR causes less than 100% of the light to reflect at above the TIR angle (or the critical angle). The light rays that are not reflected are leaked out as the transmission diffraction orders light rays (T-$1^{st}$) noted above.

Figure 5:
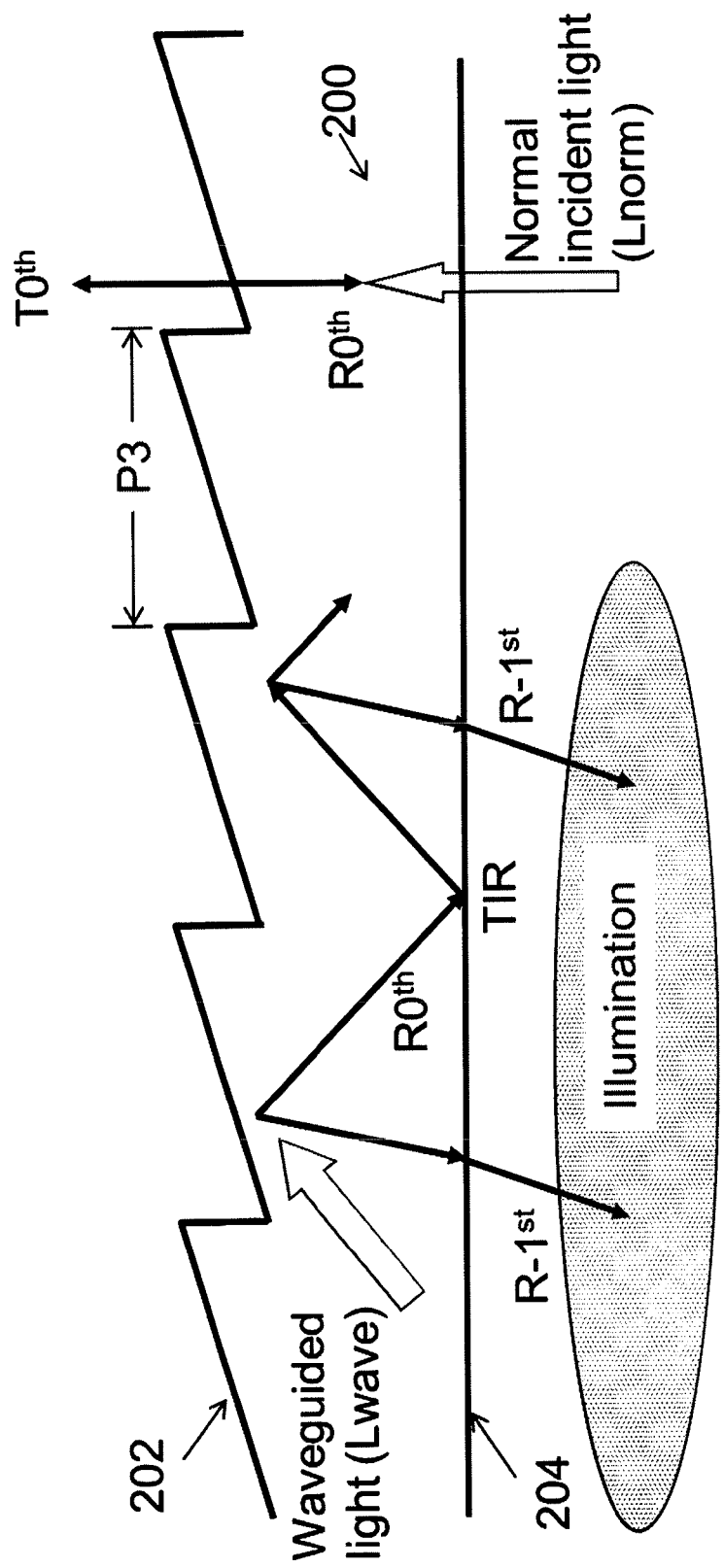
FIG. 5 illustrates a cross sectional view of an exemplary blaze grating surface panel in accordance with the embodiment described herein.

FIG. 5 illustrates a cross sectional view of another exemplary diffuser panel in accordance with the embodiment described herein. The diffuser panel 200 is generally shown in the cross sectional view. The diffusive surface 202 is a grating surface, for example, a blaze grating surface. Also for example, the lower surface 204 may be generally flat and smooth.

The exemplary blaze grating surface 202 has a grating period P3 that satisfies, $$\lambda/(n_d+n_{in})<P3<\lambda,$$

(similar to equation 3 above)

which yields no solution for the diffraction order (non-zero m) for the normal incident angle ($\theta_{in}=0$) or near the normal incident angle, such that the light at or near the normal incident angle transmits through the panel without being diffracted. In such a case, objects would be clearly visible when viewed through the exemplary diffuser panel, through either side of the diffuser panel at or near the normal incident angle. Thus, the exemplary diffuser panel would appear transparent.

On the other hand, for incident angles greater than the total internal reflection angle (or the critical angle), which are the angles for light waveguided in the diffuser panel, equation (1) yields diffraction orders but only a few (preferably only one). This diffraction is diffusive, because the light is spread out and can be cast out over the entire panel surface. The exemplary diffuser panel can be used for illumination if light is waveguided in the panel and directed toward the grating surface 202 at an oblique angle.

Different from the diffuser panel 100 with binary grating surface 102 illustrated in FIG. 4, the diffuser panel 200 with blaze grating surface 202 illustrated in FIG. 5 has only one reflection diffraction order of light rays (R-$1^{st}$) and only one order of diffraction. Thus, the waveguided light directed toward the grating surface 202 at an oblique angle would cause illumination on only one side of the diffuser panel 200, specifically the side opposite the grating surface 202, or on the same side as the lower surface 204.

The present invention describes exemplary diffuser panels with a binary grating surface and a blaze grating surface. It is understood that other types of grating surfaces, for example, a sinusoidal grating surface, may also be used.

Figure 6B:
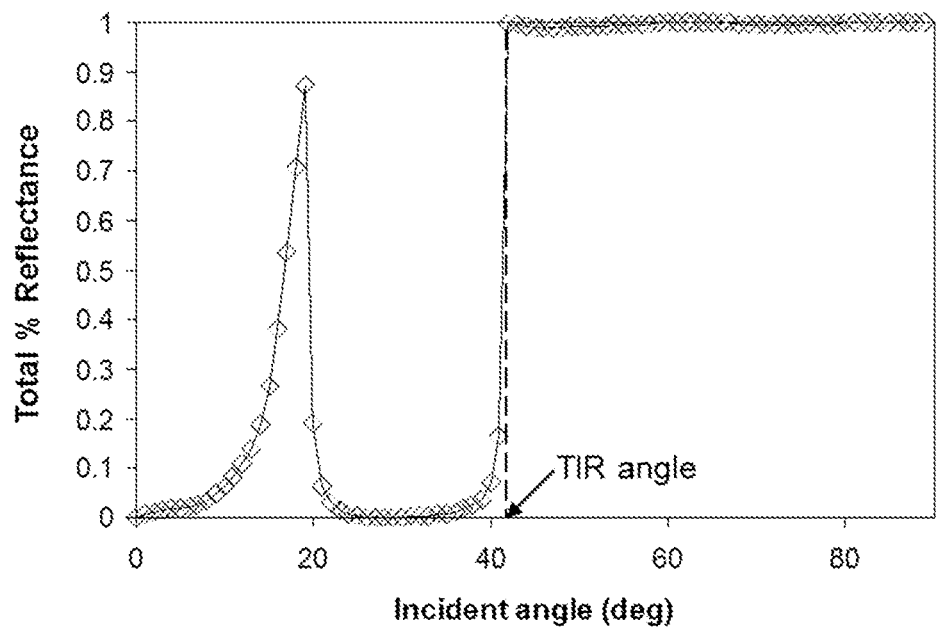
FIG. 6(b) illustrates the optical reflection characteristics of an exemplary blaze grating surface panel, with restored total internal reflection (TIR) in accordance with the embodiment described herein.

FIG. 6(b) illustrates the optical reflection characteristics of the exemplary diffuser panel 200 illustrated in FIG. 5, in accordance with the embodiment described herein. As disclosed above, the diffuser panel 200 with blaze grating surface 202 illustrated in FIG. 5 has only one reflection diffraction order of light rays (R-$1^{st}$) and only one order of diffraction, causing illumination from the waveguided light on only one side of the diffuser panel 200. This uni-directional illumination is due to the properties of blaze grating surface 202 illustrated in FIG. 6(b), which shows the total internal reflection (TIR) is restored to 100% reflection above the TIR angle (or the critical angle), such that there are no leakages of lights as transmission diffraction orders light rays (T-$1^{st}$) above the TIR angle (or the critical angle).

FIGS. 7(a)-7(d) illustrate exemplary diffuser panels with light emitting elements integrated on one edge in plane views and cross sectional views in accordance with the embodiment described herein.

Figure 7A:
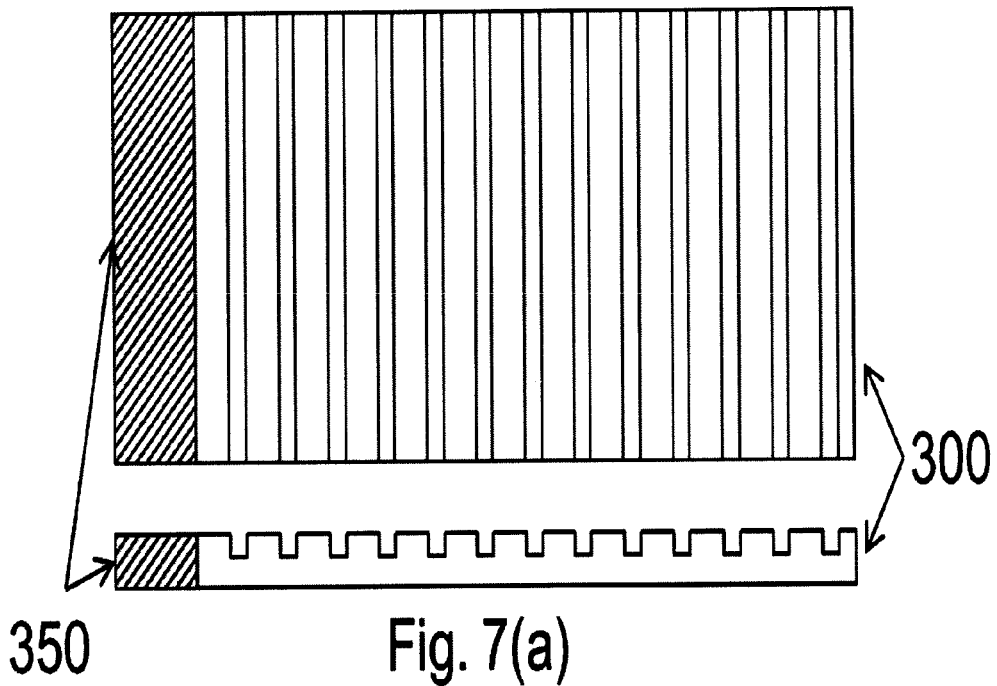

FIG. 7(a) illustrates a plane view and a cross sectional view of one exemplary diffuser panel with a similar cross sectional profile as the diffuser panel illustrated in FIG. 4. The diffuser panel 300 may have for example, a binary grating surface. The diffuser panel 300 may be integrated with a light emitting element 350 on one edge of the diffuser panel 300. The light emitting element 350 may be for example, light source such as LED, laser diode and SLD (super luminescent diode), or coupling optics such as collection lens, collimator, and beam shaper, etc. which transmit light generated from a source of light. The light emitting element 350 may be mounted or bonded on the one edge of the diffuser panel 300, for example by mechanical mounting structures, chemical adhesives, heating, or a combination of such mounting methods. The light emitting element 350 may be for example, designed to direct light of one or more visible wavelengths into the diffuser panel 300 from the one edge, at one or more oblique angles relative to the plane of the diffuser panel 300, or at one or more angles that are greater than the total internal reflection (TIR) angle or critical angle of the diffuser panel 300.

In this configuration, the light transmitted by the light emitting element 350 into the diffuser panel 300 will be waveguided and diffused from generally the entire surface of diffuser panel 300, as noted above, to illuminate objects on both sides of the panel via bi-directional illumination. As also noted above, the illuminated objects would be clearly visible when viewed through the panel. This provides a transparent diffuser that can provide higher efficiency of lighting and a more pleasant transparent view.

FIG. 7(c) illustrates a plane view and a cross sectional view of another exemplary diffuser panel. The diffuser panel 500 is integrated with a light emitting element 550, which may be similar to the light emitting element 350 illustrated in FIG. 7(a). The diffuser panel 500 comprises a blaze grating surface as shown.

In this configuration, the light transmitted by the light emitting element 550 into the diffuser panel 500 will be waveguided and diffused from generally the entire surface of diffuser panel 500, as noted above, to illuminate objects. As also noted above, the illuminated objects would be clearly visible when viewed through the panel. This provides a transparent diffuser that can provide higher efficiency of lighting and a more pleasant transparent view.

Figure 7B:
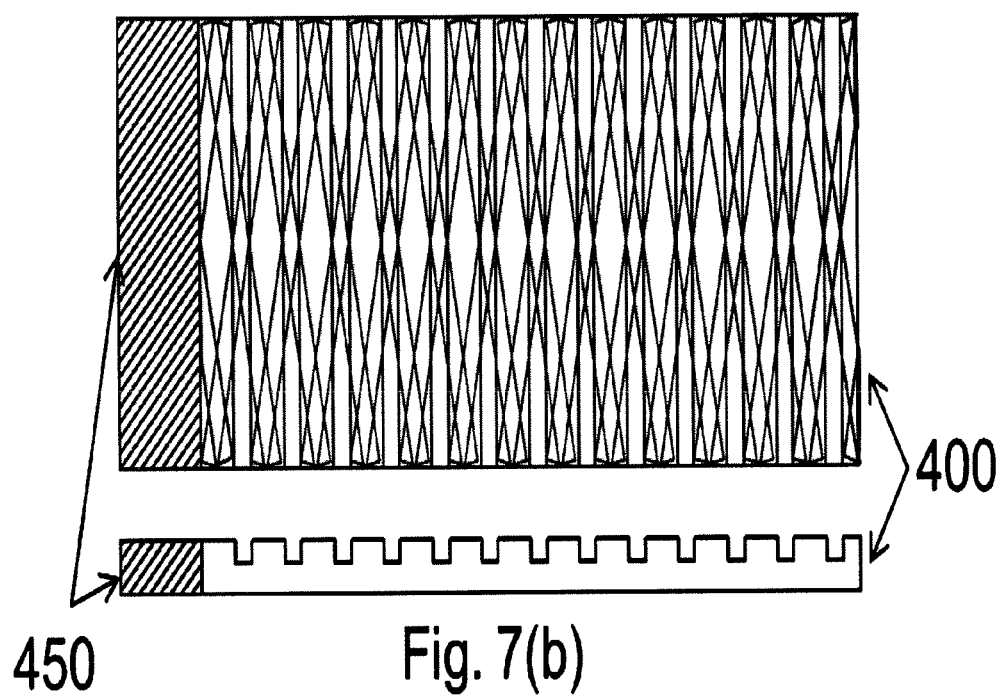

FIGS. 7(b) and 7(d) illustrate plane views and cross sectional views of two other exemplary diffuser panels. The diffuser panels 400 and 600 are similar to the diffuser panels 300 and 500 in FIGS. 7(a) and 7(c), but the diffuser panels 400 and 600 may include for example, additional grating grooves in diagonal patterns or crisscrossing patterns. The additional grating grooves introduce additional diffraction angles and patterns to the diffused light, and thus provide more scattered illumination effect for the diffuser panels 400 and 600.

The grating patterns as illustrated are intended as non-limiting examples. Additional grating patterns are possible, for example, spiral, arbitrary, triangular, curved, and etc.

The diffuser according to the present disclosed invention can be made with ordinary diamond cutting on a molding material (nickel for example) to form a mold, and then the diffuser panel is formed by casting or injecting a substrate material, such as a transparent plastic material, into the mold.

Alternatively, a different kind of mold can be made by electron beam writing on electron beam resist spun on a silicon wafer, the resist is developed and the silicon is etched using an ordinary reactive ion etching machine. The silicon mold is mounted in a step-and-repeat daughter mold generation machine to make a larger size daughter mold. The diffuser panel is then formed by casting or injecting a substrate material, such as a transparent plastic material, into the daughter mold.

Further, a diffuser panel can be directly made by laser cutting on a preformed transparent substrate panel using any kind of laser such as CW or pulsed CO2 laser, DPSS (Diode Pumped Solid State) laser, fiber laser, disc laser, laser diode, excimer laser, femto-second laser, pico-second laser, and nano-second laser.

Figure 8:
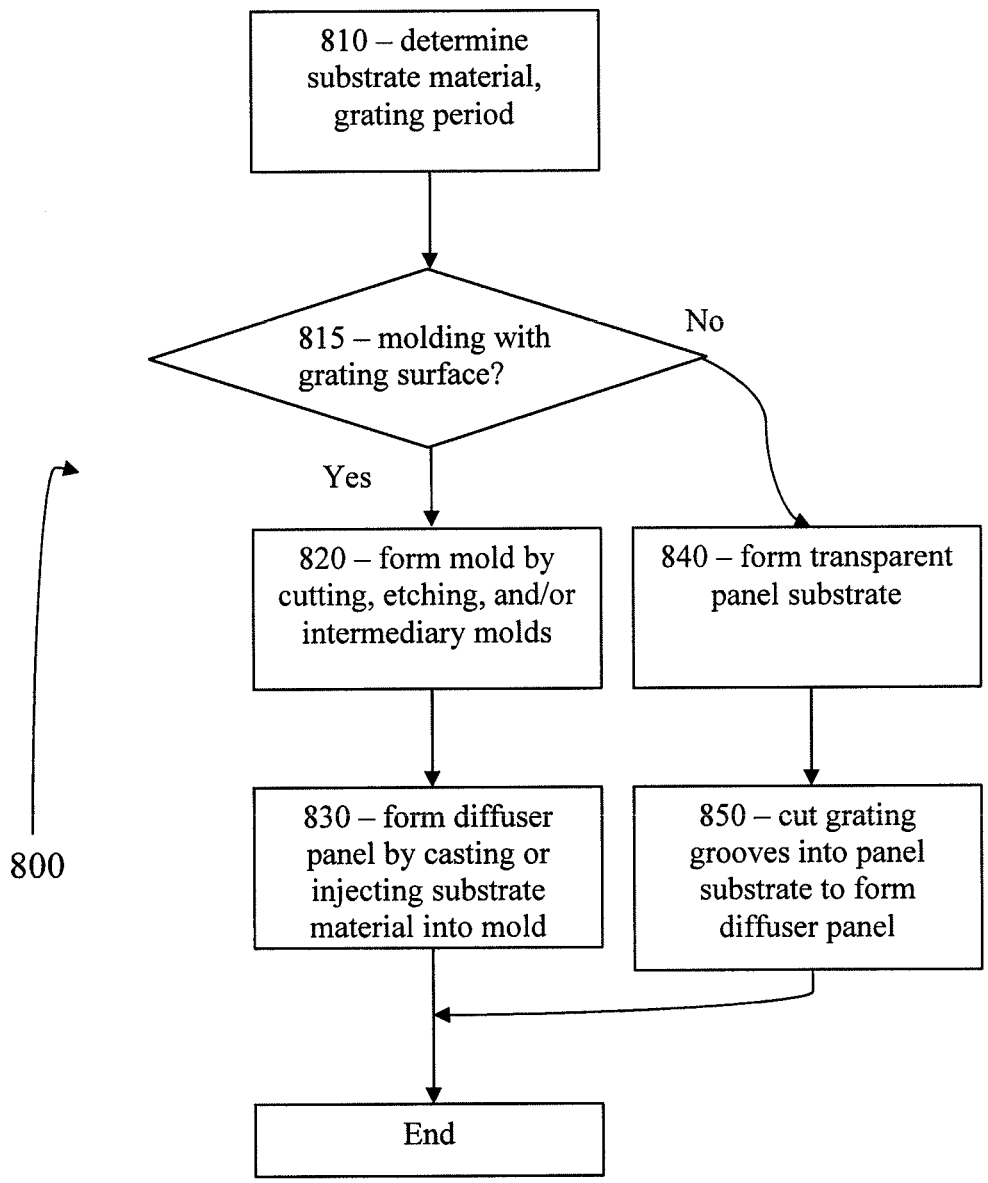
FIG. 8 illustrates an exemplary manufacturing process flow for manufacturing the diffuser panels in accordance with the embodiment described herein.

FIG. 8 illustrates an exemplary manufacturing process flow for manufacturing the diffuser panels in accordance with the embodiment described herein. The manufacturing process 800 starts at step 810, where the appropriate substrate material and the grating period for the diffuser panel are determined or selected. The determination of the substrate material may depend upon availability of material, cost of material and manufacturing, quality and reliability of the material, and the type of use intended for the diffuser panel. Once the substrate material is selected, its refractive index may also be known. Then the grating period p for the diffuser panel can be determined or chosen using the equation:

$$\lambda_{max}/(n_d+n_{in}) < p < \lambda_{min},$$

(similar to equation 5 above).

At step 815, if the process is done by molding the material using a mold that comprises a grating surface, then the process continues to step 820. Otherwise, a mold without a grating surface would be used, then the process continues to step 840.

At step 820, a mold may be formed by pressing, cutting, and/or etching processes, such as, diamond cutting, laser cutting, chemical etching, ion etching, resist patterned etching, etc., to make the molding surface for the grating surface of the diffuser panel, using the determined grating period. Or intermediary molds may be formed by such cutting and/or etching processes, and then the molding surface for the grating surface can be transferred to a final mold by pressing, or other transfer methods.

At step 830, the diffuser panel is formed by casting or injection the substrate material into the final mold. The diffuser panel would be then formed with the grating surface. Then the diffuser panel may be separated and removed from the mold. Some additional cutting, polishing, cleaning, baking, annealing, setting, and/or laminating steps may be performed on the diffuser panel to finalize its form and adjust its functions. Additionally, light emitting elements may be mounted on the diffuser panel as an integrating process step. After step 830, the diffuser panel is completed, and the process ends.

Alternative to steps 820 and 830, at step 840, a transparent panel substrate is preformed using the selected substrate material, by for example, casting or injecting the material into a mold that does not have a molding surface for the grating surface. Some additional cutting, polishing, cleaning, baking, annealing, setting, and/or laminating steps may be performed on the transparent panel to adjust its form and its functions.

At step 850, the transparent panel substrate is pressed, cut, and/or etched by processes, such as, diamond cutting, laser cutting, chemical etching, ion etching, resist patterned etching, etc., to form the grating surface of the diffuser panel, using the determined grating period. Some additional cutting, polishing, cleaning, baking, annealing, setting, and/or laminating steps may be performed on the diffuser panel to finalize its form and adjust its functions. Additionally, light emitting elements may be mounted on the diffuser panel as an integrating process step. After step 850, the diffuser panel is completed, and the process ends.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. In this regard, no attempt is made to show structural details of the present invention in more detail than is necessary for the fundamental understanding of the present invention. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A light diffuser panel for coupling to an optical element, comprising:
    a substrate with a first surface that is diffusive to a plurality of wavelengths of light and a second surface;
    wherein the substrate comprises a material with a refractive index $n_{in}$ that is greater than a refractive index $n_d$ of a medium outside of the first surface,
    $\lambda_{min}$ is a minimum wavelength of the plurality of wavelengths of light,
    $\lambda_{max}$ is a maximum wavelength of the plurality of wavelengths of light,
    the first surface is a diffractive grating surface with a grating period P for diffusing angled light without diffusing at least one of normal incident light and light incident at an angle approximate to the normal incident light,
    the grating period P is greater than $\lambda_{max}/(n_d+n_{in})$, and P is smaller than $\lambda_{min}$.

2. The light diffuser panel according to claim 1, wherein the substrate comprises at least one location on an edge of the substrate configured to receive the plurality of wavelengths of light from a light emitting element, at an angle of incidence relative to a normal of one of the first surface and the second surface,
    the angle of incidence being greater than a critical angle of the substrate, such that the plurality of wavelengths of light are waveguided in the substrate by total internal reflection and diffused by diffraction to allow a portion of at least one of the plurality of wavelengths of light to exit the substrate from at least one of the first surface and the second surface.

3. The light diffuser panel according to claim 2, wherein the light emitting element is mounted on the at least one location on the edge of the substrate, coupled to the substrate and configured to transmit the plurality of wavelengths of light into the substrate at the angle of incidence.

4. The light diffuser panel according to claim 1, wherein the first surface comprises a plurality of binary grating grooves to allow a portion of at least one of the plurality of wavelengths of light to exit the substrate from the first surface and the second surface.

5. The light diffuser panel according to claim 1, wherein the first surface comprises a plurality of blaze grating grooves to allow a portion of at least one of the plurality of wavelengths of light to exit the substrate from only the second surface.

6. The light diffuser panel according to claim 1, wherein the first surface comprises at least one of symmetrical triangular grating, symmetrical sinusoidal grating, asymmetrical triangular grating, and asymmetrical sinusoidal grating.

7. The light diffuser panel according to claim 2, wherein the light emitting element comprises at least one of a LED, a laser diode, a fluorescent light source, an optical waveguide, an optical reflector, an optical refractor, and a polarizer.

8. The light diffuser panel according to claim 1, wherein the first surface comprises a plurality of grating grooves in a pattern comprising at least one of parallel grooves, diagonal grooves, triangular grooves, spiral grooves, and hatched grooves.

9. A manufacturing process for manufacturing a light diffuser panel that is configured to diffuse a plurality of wavelengths of light, wherein $\lambda_{min}$ is a minimum wavelength of the plurality of wavelengths of light and $\lambda_{max}$ is a maximum wavelength of the plurality of wavelengths of light, the method comprising:
    determining a material for a substrate with a refractive index $n_{in}$ that is greater than a refractive index $n_d$ of a medium within which the substrate is positioned;
    selecting a grating period P, wherein the grating period P is greater than $\lambda_{max}/(n_d+n_{in})$, and P is smaller than $\lambda_{min}$; and
    forming the substrate with a first surface that is diffusive to the plurality of wavelengths of light and a second surface, wherein the first surface is a diffractive grating surface with a grating period P for diffusing angled light without diffusing at least one of normal incident light and light incident at an angle approximate to the normal incident light.

10. The manufacturing process for manufacturing a light diffuser panel according to claim 9, wherein forming the substrate comprises:

forming a mold with a molding surface that is an inverse match of the first surface having the diffractive grating surface with the grating period P; and at least one of injecting and casting the material into the mold to form the substrate.

11. The manufacturing process for manufacturing a light diffuser panel according to claim 9, wherein forming the substrate comprises:

forming the substrate; and at least one of cutting, etching, and pressing the first surface to form the diffractive grating surface on the first surface.

12. A light diffuser panel for coupling to an optical element, comprising:

a substrate with a first surface that is diffusive to a plurality of wavelengths of light and a second surface;

wherein the substrate comprises a material with a refractive index $n_{in}$ that is greater than a refractive index $n_d$ of a medium outside of the first surface, $\lambda_{min}$ is a minimum wavelength of the plurality of wavelengths of light, $\lambda_{max}$ is a maximum wavelength of the plurality of wavelengths of light, the first surface is a diffractive grating surface with a grating period P which has one reflection order of diffraction and provides illumination on one side of the diffuser panel, the grating period P is greater than $\lambda_{max}/(n_d+n_{in})$, and P is smaller than $\lambda_{min}$.

13. A manufacturing process for manufacturing a light diffuser panel that is configured to diffuse a plurality of wavelengths of light, wherein $\lambda_{min}$ is a minimum wavelength of the plurality of wavelengths of light and $\lambda_{max}$ is a maximum wavelength of the plurality of wavelengths of light, the method comprising:

determining a material for a substrate with a refractive index $n_{in}$ that is greater than a refractive index $n_d$ of a medium within which the substrate is positioned;

selecting the grating period P, wherein the grating period is greater than $\lambda_{max}/(n_d+n_{in})$, and P is smaller than $\lambda_{min}$; and forming the substrate with a first surface that is diffusive to a plurality of wavelengths of light and a second surface, wherein the first surface is a diffractive grating surface with a grating period P which has one reflection order of diffraction and provides illumination on one side of the diffuser panel.

* * * * *